(12) United States Patent
Stieger et al.

(10) Patent No.: US 7,472,642 B2
(45) Date of Patent: Jan. 6, 2009

(54) REPLACEABLE NOZZLE FOR PRODUCING A FROTHED LIQUID

(75) Inventors: Michael Stieger, La Croix (CH); Alfred Yoakim, St-Legier-La Chiesaz (CH)

(73) Assignee: Nestec S.A., Vevey (CH)

( * ) Notice: Subject to any disclaimer, the term of this patent is extended or adjusted under 35 U.S.C. 154(b) by 323 days.

(21) Appl. No.: 11/279,498

(22) Filed: Apr. 12, 2006

(65) Prior Publication Data
US 2006/0230943 A1 Oct. 19, 2006

(30) Foreign Application Priority Data
Apr. 13, 2005 (EP) ................................. 05008099

(51) Int. Cl.
*A47J 31/00* (2006.01)
(52) U.S. Cl. ........................ 99/293; 99/323.1; 99/453
(58) Field of Classification Search .......... 99/279–323, 99/509–513, 275, 452–455, 323.1; 261/DIG. 16, 261/DIG. 76
See application file for complete search history.

(56) References Cited

U.S. PATENT DOCUMENTS 5,207,148 A * 5/1993 Anderson et al. ............. 99/281
5,295,431 A 3/1994 Schiettecatte et al.
5,509,349 A * 4/1996 Anderson et al. ........... 99/323.1
5,862,740 A * 1/1999 Grossi ........................ 99/293
6,499,389 B1 12/2002 Probst

FOREIGN PATENT DOCUMENTS

| EP | 0472272 | 2/1992 |
|---|---|---|
| EP | 0813834 | 12/1997 |
| EP | 1430819 | 6/2004 |
| WO | WO2004054413 | 7/2004 |

* cited by examiner

*Primary Examiner*—Timothy F. Simone
(74) *Attorney, Agent, or Firm*—Bell, Boyd & Lloyd LLP (57) ABSTRACT

A nozzle adaptable to the steam outlet of a coffee machine is designed to froth a liquid such as e.g. milk. Said nozzle comprises in the direction of the steam flow path: a steam inlet opening, a restriction with limited cross-section adapted to accelerate the velocity of the steam flow, and at least one cavity having a cross-section larger than the restriction and from which the frothed liquid can be drained. The nozzle further comprises an outer casing comprising a smoothening reservoir and a jet breaking surface facing the opening and at least one outlet opening radially offset relatively to the opening of the portion of the enlarged mixing cavity. The outer casing is arranged at least partially around the tubular portion of mixing cavity.

20 Claims, 7 Drawing Sheets

REPLACEABLE NOZZLE FOR PRODUCING A FROTHED LIQUID

BACKGROUND

The present invention relates to a nozzle which can be attached to a steam outlet of a coffee machine. Especially for coffee machines adapted to produce a cappuccino-style coffee it is known to provide a water steam outlet which is cooperating with a supply of milk such that hot frothed milk can be produced.

In order to generate frothed milk, a defined amount of air is usually sucked into the stream of milk and steam.

When carrying out this frothing repeatedly, the nozzle will eventually be contaminated with the residues of heated milk which are prone to bacterial contamination. Correspondingly it is well known that ideally after each use such a frothing nozzle should be rinsed and cleaned.

From U.S. Pat. No. 6,499,389 B1 a device for producing milk froth for cappuccino is known, having a nozzle arrangement that is disposed downstream of a steam pipe and has a vacuum chamber, into which a milk supply line terminates. An air conduit connects to the milk supply lines upstream of the vacuum chamber. An emulsifying chamber is disposed downstream of the vacuum chamber, with the emulsifying chamber having a chamber wall, a floor with a central, flow-diverting protrusion and an outlet. The central, flow diverting protrusion is embodied as a flow trap surrounding the outlet in the flow such that the protrusion diverts a mixture essentially to a direction of flowing in the primary flow direction essentially countered to the primary flow direction. U.S. Pat. No. 6,499,389 furthermore teaches (see column 3, lines 50 to 55) that the elements of the emulsifying chamber can be made of a half-hard synthetic material, notably chloroprene caoutchouc ("neoprene"). This synthetic material has sufficient dimensional stability when exposed to hot steam. On the other hand due to the complex design and the costs of the materials used for this known device it cannot be produced with reasonable costs in order to serve as a disposable nozzle which is replaced after a limited number of uses.

WO 2004/054413 A1 proposes a nozzle adaptable to a steam outlet of a coffee machine and designed to froth a liquid. The nozzle thereby is made of one single piece and comprises an opening for a steam supply, a restriction in the extension of said opening, and an enlarged zone in the axis of said restriction. Said opening provides an outlet for the liquid, having a cross-section substantially equal to the cross-section of the opening. Perpendicular to the opening a conduit for supply of the liquid and an air inlet is provided.

According to this known prior art the nozzle can be made for example from a polypropylene (PP) plastics material or from a metal, such as for example Inox. It is said that this known nozzle can be used throughout the typical use cycles of an entire day.

One problem that is experienced in practice with the devices of the prior art is that the device tends to cause the product or steam to splash, in particular, in conditions where there is a shortage of milk. For instance, when the milk supply becomes depleted, the ratio of steam to milk increases (for more steam) which so induces a too energetic flow of steam or mixture that comes out of the device. This is a critical issue, as the flow of steam tends to dirty the place, either directly by simply splashing in an uncontrolled manner or indirectly by blowing out the milk froth already made in the cup.

U.S. Pat. No. 5,295,431 relates to an accessory for the preparation of a creamy air-milk-steam emulsion with anti-splashing means being positioned at one side outlet of a first flow means. Such a device has several disadvantages. The open configuration on a side of the accessory is not suitable because in order, to be effective, the anti-plashing chamber must be large enough to allow the frothed liquid to swirl in the chamber before exiting the chamber. Therefore, this configuration is bulky and not economically and environmentally adapted for a disposable application after a limited number of uses.

SUMMARY

It is an object of the present invention to obviate the disadvantages of the known nozzles of the prior art.

The nozzle of the invention is adaptable to the steam outlet of a coffee machine designed to froth a liquid such as e.g. milk, said nozzle. The nozzle comprises in the direction of the steam flow path:
  a steam inlet opening,
  a restriction with limited cross-section adapted to accelerate the velocity of the steam flow,
  at least one tubular portion of mixing cavity having a cross-section larger than the restriction and comprising an outlet opening. The nozzle furthermore comprises a conduit for entry of the liquid or a liquid/air mixture, the conduit joining the steam flow path at the restriction or stream-upwards of the restriction.

According to one inventive aspect of the invention, the nozzle further comprises an outer casing comprising a smoothening reservoir and a jet breaking surface facing the opening and at least one outlet opening radially offset relatively to the opening of the portion of the enlarged mixing cavity.

Furthermore, the outer casing is arranged at least partially around the tubular portion of the mixing cavity. Therefore, the splashing issues are resolved within a more compact construction which is more adapted for a disposable application.

Preferably, the casing forms a smoothening reservoir of annular section that extends concentrically around the tubular portion of mixing cavity. This configuration participates to a more compact design but also performs more efficiently. The annular reservoir forms a particularly effective dampening effect since: a) the frothed liquid is redirected at about 180 degrees from its dispensed point at the exit of the mixing cavity and b) the frothed liquid is distributed over a larger contact surface of the device, in this annular reservoir, therefore involving more frictional forces to dampen liquid before it can finally exit the device.

According to another aspect thereby the vertical partition of the main body of the nozzle of WO 2004/054413 is replaced by a horizontal partition.

According to another aspect, the dimensions and the material used for the nozzle are selected such that the nozzle can only produce a frothed liquid for a limited number of use cycles. Such it can be avoided that a user uses the nozzle over a too long time duration.

According to a still further aspect the partition between the two pieces is symmetrical in rotation. This does not have to be necessarily combined with the horizontal partitioning, but can also be of advantage when using a vertical partition.

Surprisingly it has been found that a horizontal partition can in particular solve the leakage issues while maintaining the advantages of a simple device, easy to assemble, of low protection costs and of limited durability for safety reasons.

The above object is achieved by means of the features of the independent claims. The dependent claims develop further the central idea of the present invention.

The mixing cavity can further comprise first means for breaking the energy of the jet of frothed liquid before it leaves the cavity.

The nozzle can be made from a material which wears, erodes or is deformed when hot steam is impinging on it.

The nozzle can be made e.g. from polypropylene (PP) or Polyamide.

The two pieces constituting the main body of the nozzle can be clipped together (manually or automatically e.g. by a robotic device). Therefore, the assembly of the device is facilitated during manufacturing making it inexpensive to an extent that the nozzle is adapted to be disposed of after several uses.

The clipping means are preferably configured to include at least one sealing means such as at least one sealing flange which is arranged to mate with at least one recession part. Therefore, the device does not need any additional sealing members, such as O-rings and the like. It does not need any outside member, such as e.g. a socket, for sealing the two pieces either.

Furthermore, the sealing flange can be such that it confers the desired sealing properties only over a limited number of use cycles.

The two pieces constituting the main body of the nozzle can be releasably connected to each other.

The horizontal connection of the two pieces can comprise sealing means.

The nozzle can be designed such that an axial sealing force acts on the sealing means.

The sealing means can comprise an annular rib.

According to a still further aspect of the present invention the nozzle is made from a material which is selected such it wears, erodes or deforms at regions where the hot steam coming from the steam opening is impinging on it such that the maximum number of use cycles of the nozzle is limited.

Especially, when exceeding the maximum number of use cycles, the quality of the produced milk froth can be deteriorated to an extent that the user is highly motivated to replace the nozzle.

The cooperation of the steam path and the material of the nozzle can be designed such that the minimum number of repeated use cycles is at least one and the maximum number of repeated uses cycles of the nozzle is limited to 50, preferably to 30, most preferably to 20 use cycles or less.

Finally, the invention also relates to a coffee machine having a steam outlet and being provided with a disposable nozzle as set forth above.

Further advantages, features and objects of the present invention will become evident for the man skilled in the art when reading the following detailed explanation of an embodiment of the invention taking in conjunction with the figures of the accompanying drawings.

Additional features and advantages are described herein, and will be apparent from, the following Detailed Description and the figures.

DETAILED DESCRIPTION

Figure 1:
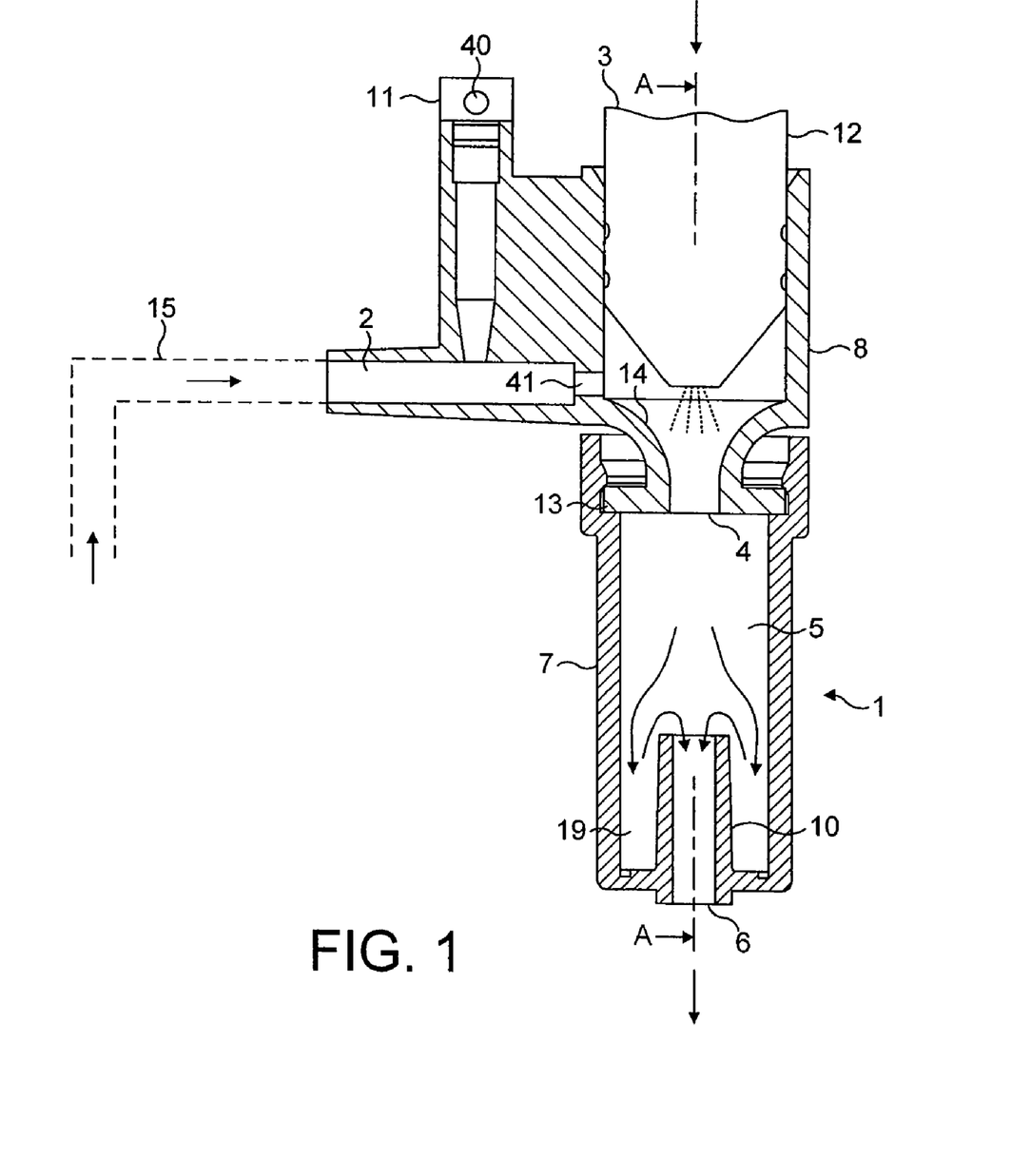
FIG. 1 shows a first cross sectional view of a nozzle according to the present invention.

FIG. 1 shows a cross-sectional view of a nozzle 1 which can be mounted on a steam outlet 12 of a coffee machine for making cappuccino. The steam outlet 12 can be plugged into a steam opening 3 of the nozzle 1, which steam opening 3 is either adapted to a specific dimension of a cooperating steam outlet 12 (in case an inelastic material is used for the steam opening 3) or adaptable to steam outlets of differing dimensions (in which case a flexible material such as e.g. silicone is used for the steam opening 3).

In the conduit 2 for example a straw 15 for drawing in a liquid such as for example milk from a milk supply can be plugged in.

In case it is envisaged to produce hot milk, it is sufficient to mix the milk supplied via the conduit 2 with a steam supply from the steam inlet 3. In case a cappuccino-style coffee is to be produced, it is necessary to froth the hot milk. To this regard an air inlet 40 is provided which terminates in the conduit 2 for supplying the milk.

The main body of the nozzle 1, i.e. the two parts 7, 8 is preferably made by injection molding. As the air inlet bore of the air inlet 40 has to be made with great precision, the air inlet 50 is preferably provided as a separately machined air inlet plug 11, i.e. a piece made separately to the parts 7, 8. The diameter of the air inlet bore is e.g. less than 0.3 mm, preferably between 0.20 mm and 0.28 mm.

Downstream of the water steam inlet opening 3 a restricted zone 4 is provided. Due to the laws of flow continuity the water steam velocity will be accelerated in the zone of the restriction 4. This creates a well-known Venturi effect, i.e. in the restriction zone 4 the static pressure drops due to the acceleration of the water steam velocity. This pressure drop creates a vacuum sucking in the liquid or the liquid/air mix coming from the conduit 2.

A similar Venturi effect is also exploited to suck in the air from the air inlet 40 into the conduit 2. To this effort a restriction 41 is provided at the intersection of the conduit 2 and the water steam flow path 3.

At the downstream side of the restriction 4 an enlarged zone 5 with increased cross-sectional dimensions is provided which slows down and quiets the stream of frothed liquid exiting the restriction zone 4.

The transition from the restriction 4 to the enlarged zone 5 can be stepped as designated with reference numeral 21 or alternatively, smooth (continuous) as schematically shown and designated with reference numeral 22.

In order to avoid the frothed liquid from splashing into a cup positioned below the exit opening 6 of the nozzle 1, jet breaking means 10 are provided in the exit area of the nozzle 1. The jet breaking means 10 are geometrically arranged such that at least the main portion of the frothed liquid exiting with high speed from the restriction zone 4 cannot directly leave the nozzle 1 through the exit opening 6, but is guided into an annular stabilizing chamber 19 surrounding the exit opening 6, before overflowing towards the exit opening 6.

The main body of the nozzle 1 is comprised of two parts 7, 8 which are connected together in a partitioning which is perpendicular to the water steam flow path. The partitioning is called a "horizontal partitioning" (in contrast to the "vertical partitioning" known from WO 2004/054413 A1) as in practical applications the water steam flow path usually is directed vertically downwards.

The two parts 7, 8 are preferably sealed together without need for a third element or seal.

Preferably the partition has a shape which is symmetrical in rotation, such as e.g. a circular shape.

Figure 2:
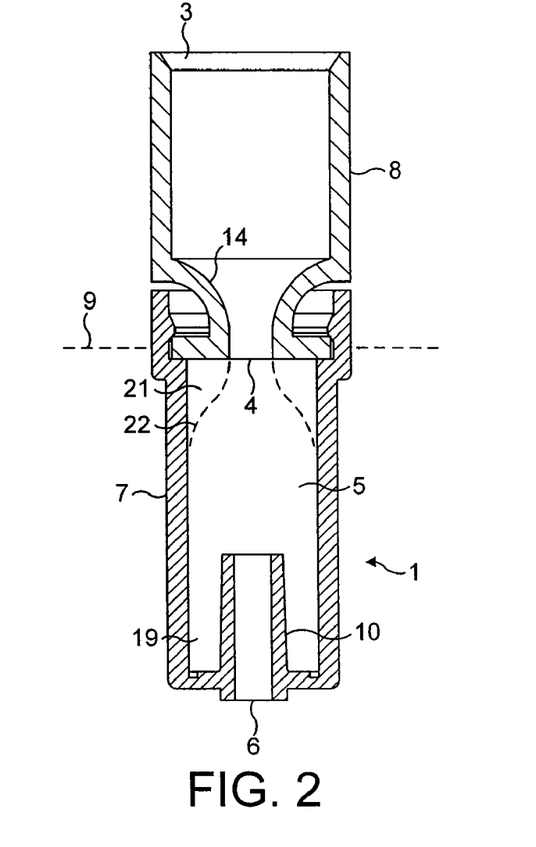
FIG. 2 shows a section along the line A-A of FIG. 1.
Figure 3:
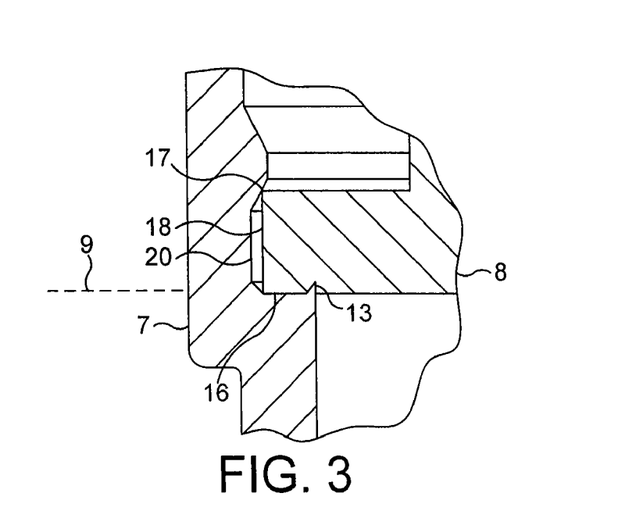
FIG. 3 shows a detailed view of the connection region of the two parts constituting the main body of the nozzle according to FIG. 1.

The partitioning axis is designated with the reference numeral 9 in FIGS. 2 and 3.

The two parts 7, 8 constituting the main body of the nozzle 1 actually are connected in a releasable manner. They are preferentially clipped together.

In the connected engagement of the two parts 7, 8 additional sealing means such as for example at least one annular rib 13 can be provided. The sealing means 13 can preferably be made from the same material and be produced integral with one of the main part 7, 8.

As the two parts 7, 8 are partitioned horizontally, the sealing surface is already used in comparison to the prior art. Further on, as the sealing surface is symmetrical in rotation, it can be produced with higher position in comparison to the longitudinal non-rotationally symmetric partitioning known from the prior art.

The clipping engagement of the two parts 7, 8 can for example be achieved by axially pushing an annular flange 18 of one of the parts 8 into an annular recession 20 of the respectively other part 7. This can be done manually or in an automated manner when manufacturing the nozzle.

The clipping force thus acts over the entire length of the sealed engagement of the two part 7, 8.

The annular recession 20 is defined between two engagement walls 16, 17 of the first part 7 which exert an axial load on the interfaces between these engagement walls 16, 17 and the respective walls of the annular flange 18. Correspondingly the sealing force is axial, i.e. parallel to the main axis of the nozzle 1 which also defines the direction of the steam flow path.

The clipping engagement preferably is sufficient for ensuring a tight sealing without additional welding such as ultrasonic, chemical or heat welding.

The nozzle 1 according to the invention is preferably made from a material which can be injection molded, such as for example polypropylene or a Polyamide. These materials furthermore allow the production of the nozzle 1 according to the present invention at costs which allow a user to dispose of the nozzle after a relatively short number of use cycles. Thus the user has no longer to thoroughly rinse and clean the nozzle which will become contaminated with milk residues after repeated use.

Due to the geometrical design and the materials used the nozzle 1 is made such that the possible maximum number of repeated use cycles is set lower than the number of use cycles at which usually a bacterial contamination occurs. Preferably the materials and the geometrical design of the nozzle are set such that after a number of 3 to 50, preferably 5 to 20, most preferably 7 to 10 use cycles the nozzle will no longer fulfill its frothing function. For instance, the liquid food such as milk can no longer be drawn in the device because the Venturi-based sucking forces are no longer sufficient and/or the small conduits are blocked or deteriorated. For instance, the device may also loose its tightness because the sealing means have worn and can start leaking after reaching a limited number of cycles.

Another limiting function for a repeated use of the nozzle is when the air inlet bore of the air inlet 4 gets at least partially blocked, e.g. by the sucked-in liquid (milk etc.) mounts into the air inlet 40 and will block it when solidifying. Once the air inlet 40 is at least partially blocked, no foaming will occur any longer for lack of air.

In any of the above scenarios the proper frothing function of the nozzle will get lost thus the user will be motivated to dispose of the nozzle and use a new nozzle for future frothing acts.

Materials which are preferred for the nozzle according to the present invention thus are for example thermoplastic food-grade material that have a relatively moderate resistance to repeated exposure to steam heat, such as e.g. Polypropylene or a Polyamide, but not e.g. silicone or metals. The geometrical design and the materials used are preferably made such that the zone 14 of the first part 8 of the main body of the nozzle 1 is deformed by the hot water steam impinging on it with accelerated velocity and a temperature of e.g. 80° C. Once these zones start to get worn out or even eroded, the flow conditions for the Venturi effect to occur will no longer be present such that the frothing function of the nozzle 1 will be visibly deteriorated.

Figure 4:
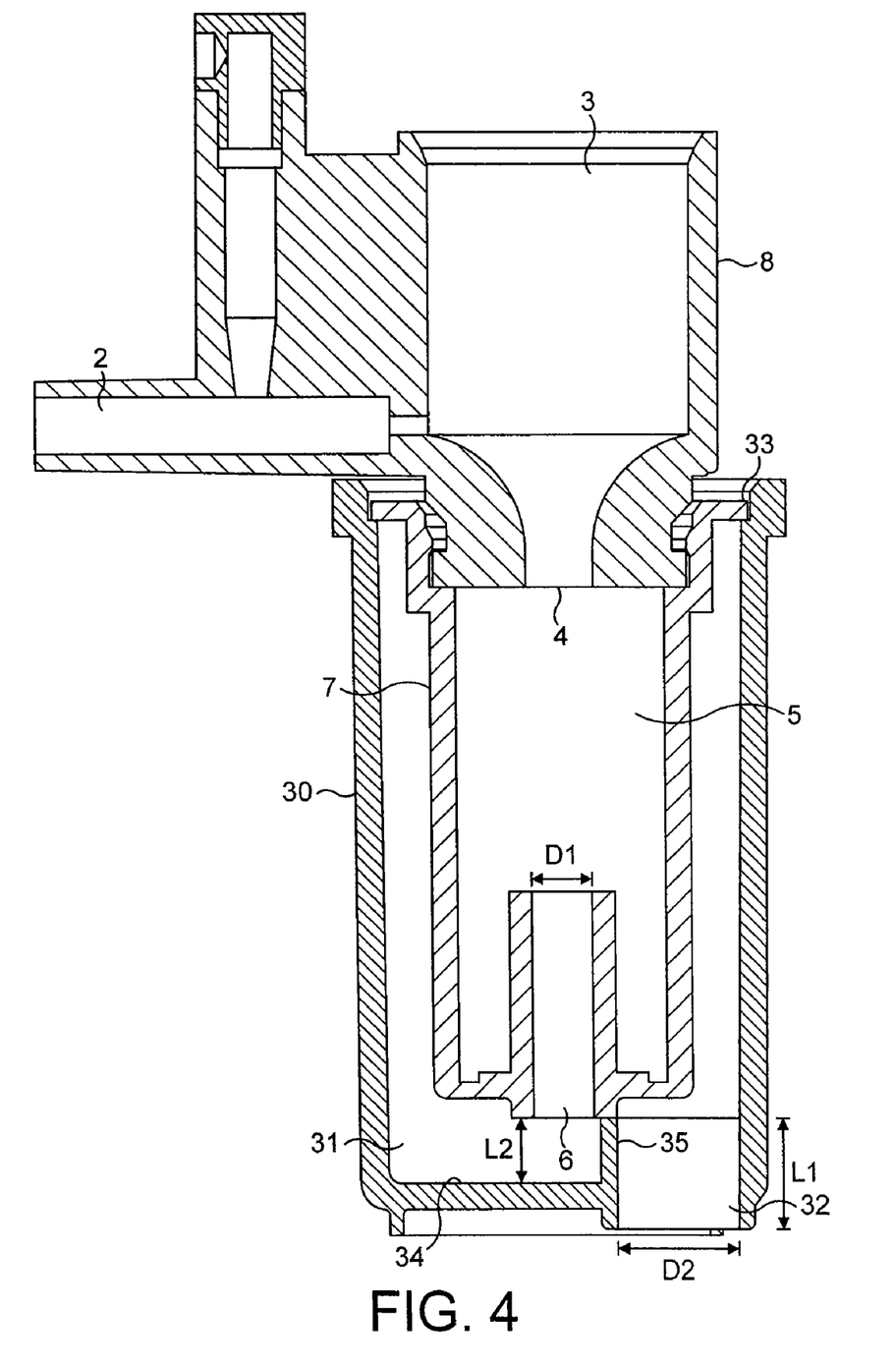
FIG. 4 shows a cross-sectional view of a further development of the nozzle according to FIGS. 1 to 3.
Figure 5:
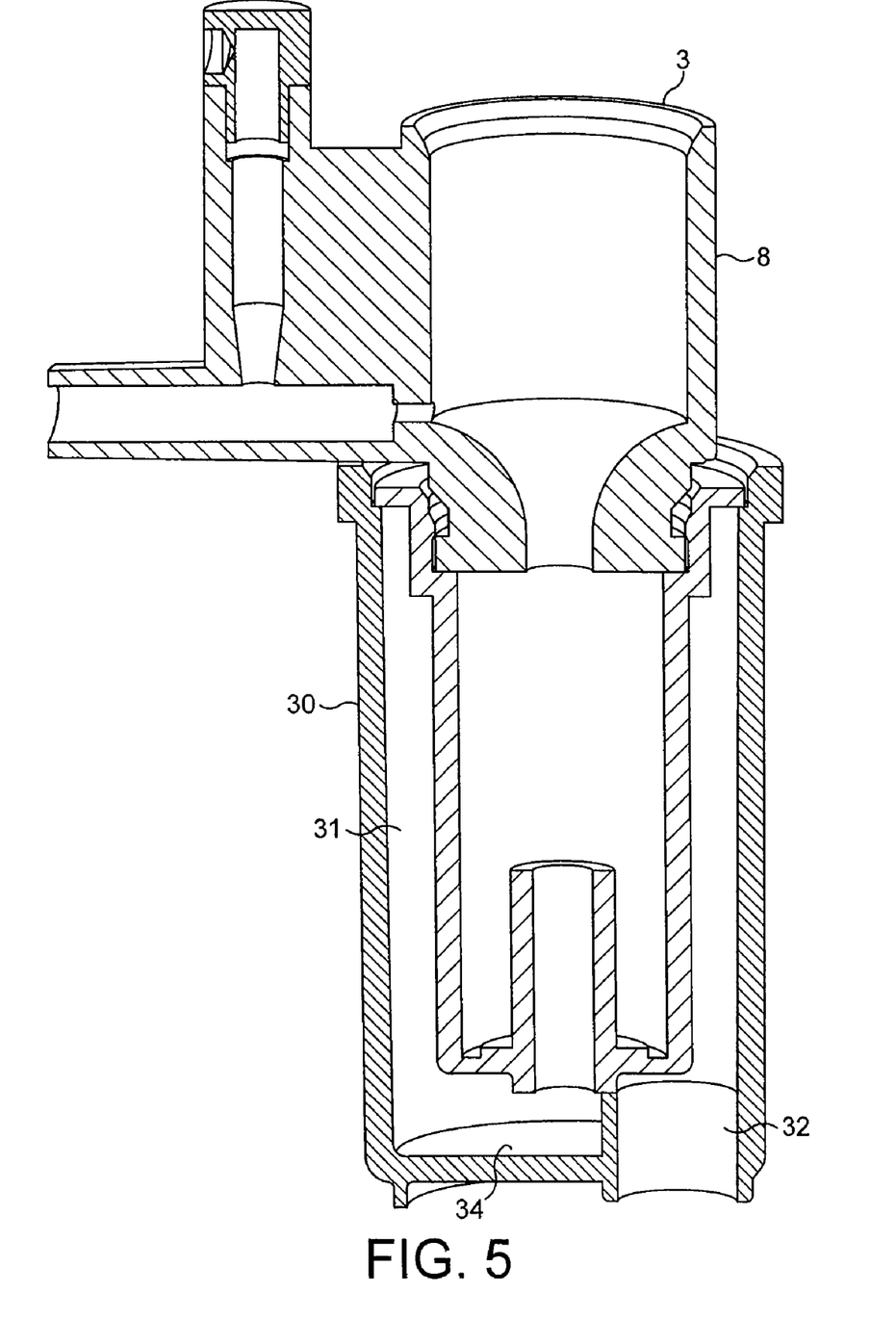
FIG. 5 shows a perspective view of FIG. 4.
Figure 6:
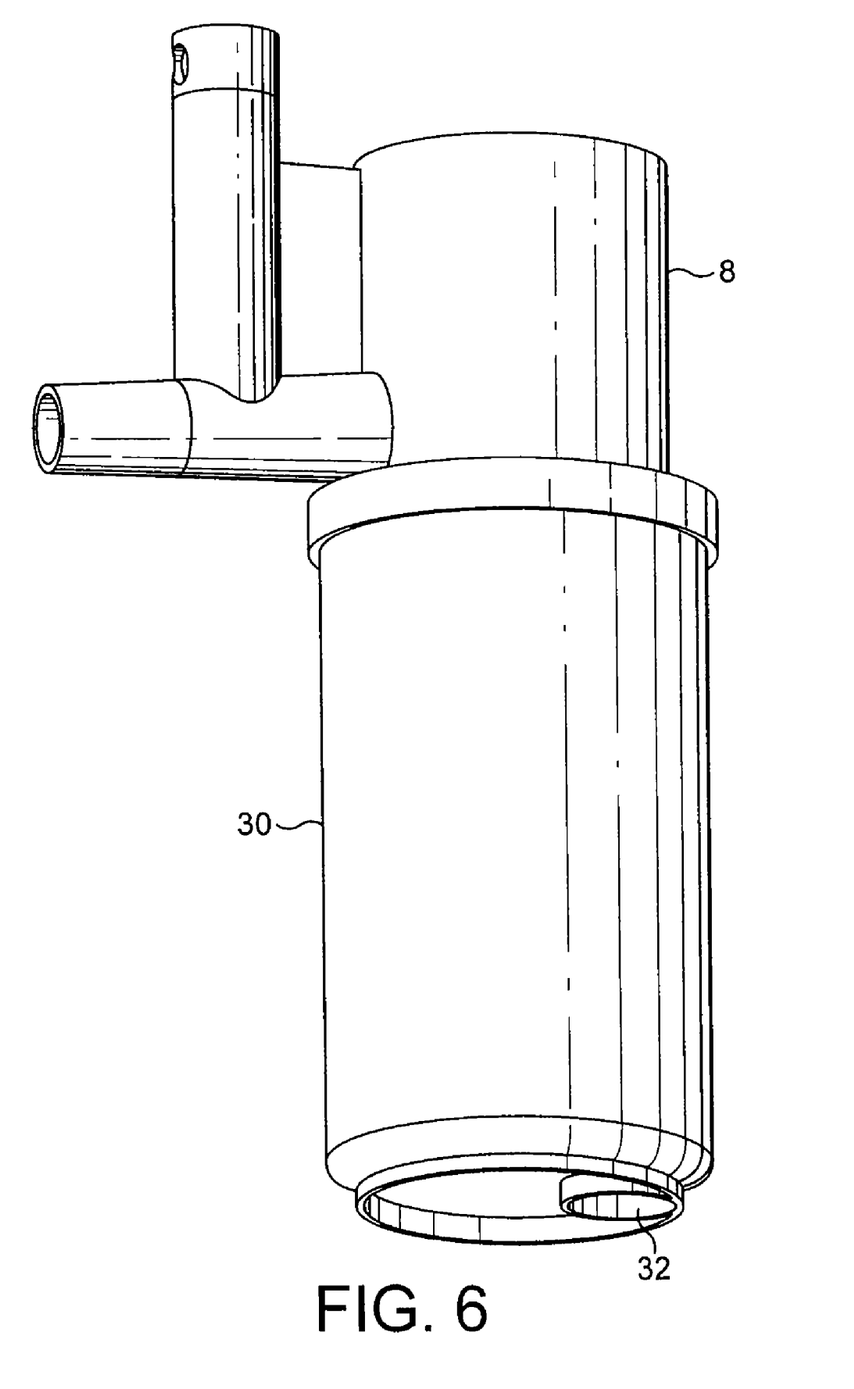
FIG. 6 shows the exterior of a nozzle comprising the further development according to FIGS. 4 and 5.

With reference to FIGS. 4 to 6 now a further development of the present invention will be explained.

A problem which can occur when using the nozzle as shown in FIG. 1 to 3 is that the accelerated steam flow can at least partially directly (i.e. without entering the smoothening chamber 19) exit through the outlet opening 6. The steam will then impinge with high energy e.g. on a coffee cup present under the nozzle.

The mentioned problem will especially occur when the milk supply (sucked in via the conduit 15, see FIG. 1) will start to be depleted. As the sucked-in milk reduces the energy of the steam flow, a reduced rate of sucked-in milk will result in an even higher steam energy at the outlet opening 6.

To overcome this problem, according to the present invention an additional outer casing 30 may be provided circumferentially around the outer wall of the part 7. The casing 30 can be clipped on the outer wall of the nozzle 1. As can be seen from FIG. 4 to 6, the outer casing 30 and the outer wall of the part 7 define an additional smoothening reservoir 31.

Again, the overflow principle is applied such that the frothed liquid leaving the outlet opening 6 impinges on a jet-breaking surface 34 of the casing 30 which is positioned in front of and at a short distance to the outlet opening 6. The jet-breaking surface is advantageously the bottom wall 34 of the outer casing 30 so that the frothed liquid will then overflow into the outlet 32 of the outer casing once the level of the frothed liquid in the smoothening reservoir reaches the height L2 by which the outlet 32 extends upwards into the smoothening reservoir. As shown in FIGS. 4 and 5, the upper end 35 of the outlet 32 extends slightly inwardly under the outlet opening 6 (e.g., 1-2 mm lower).

The outlet casing 30 presents an outlet 32 which is radially offset (and not coaxial) to the main axis of the nozzle 1. Thus the outlet 32 is also radially offset vis-à-vis the outlet opening 6, the Venturi-restriction 4 and/or the opening 3 for the steam supply.

The invention has found out that such additional outer casing 30 may be added to the nozzle without deteriorating the frothed texture of the product leaving the outlet 32.

Figure 7:
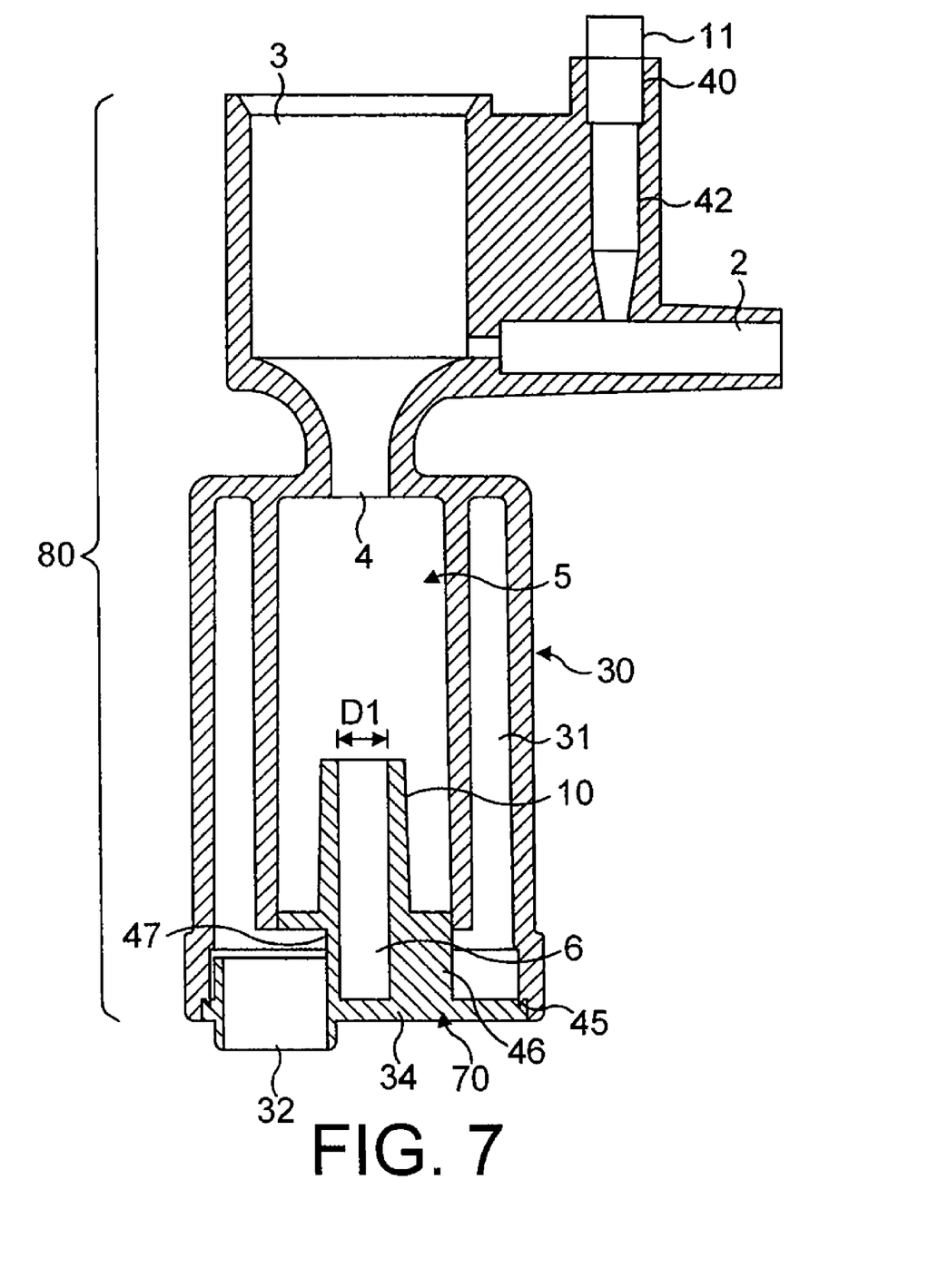
FIG. 7 shows a cross sectional view a variant of the nozzle of FIGS. 2 to 6.

FIG. 7 represents another variant of the nozzle of the invention. The same numerical references are utilized to identify the same technical means of the previous embodiment. The nozzle according to this new embodiment is formed of two injected plastic parts 70, 80 which are assembled together by clipping, welding or gluing or combinations thereof. The first part 80 constitutes as one integral injected element the following means: the steam opening 3, the milk conduit 2 and air conduit 42 merging with the milk conduit 2, the restricted zone 4, the tubular portion of the enlarged mixing cavity 5 except the transversal bottom end of it, and the outer casing 30 except the transversal bottom end of it. The second part 70 forms a closing plug for the bottom end of the device. In particular, it includes the jet breaking surface 34 and the outlet 32 of the casing and the outlet opening 6 of the portion of the mixing cavity. As in the other embodiments, the outlet opening 6 of the internal cavity 5 extends inwardly by a tubular overflow portion 10 serving as first breaking means for the frothed liquid before it exits the mixing cavity. The tubular portion is thus attached to the bottom of the casing 30 at discrete locations by a small portion of walls 46, 47.

The two parts 70, 80 are assembled according to a horizontal partition line; i.e., transverse to the exit direction of the frothed liquid.

Figure 8:
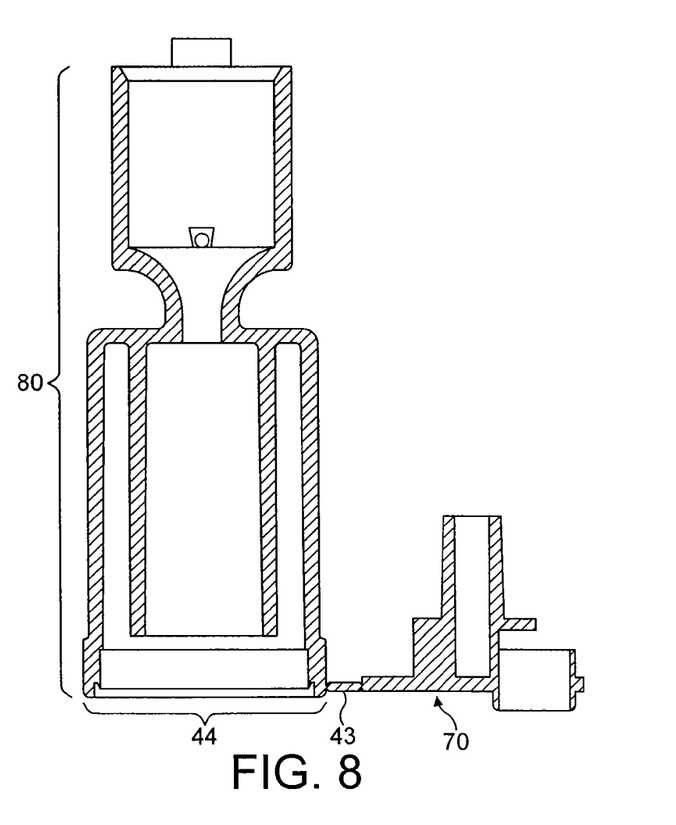
FIG. 8 shows the cross sectional view of the nozzle of FIG. 7, as taken from the injection mould before its assembling.
Figure 9:
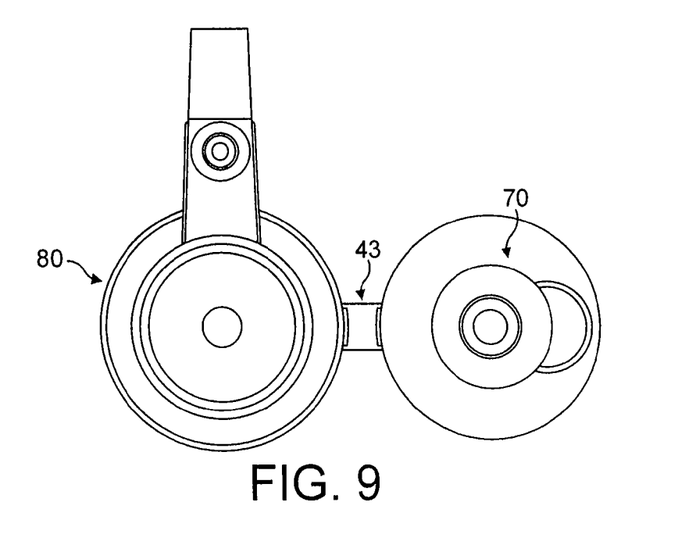
FIG. 9 shows a bottom view of the nozzle of FIG. 8.

As shown in FIG. 8, the device can be moulded in one single piece by injection moulding. The two parts 70, 80 are moulded with the part 70 being attached to the part 80 by a breakable plastic tongue 43. For assembling the device after moulding, the part 70 is detached by breaking each end of the tongue and the part 70 is press fitted into the open end 44 of the part 80. For a more solid and fluid tight connection, welding by ultrasound or heating is carried out along seal line 45.

In a broader sense, the distance L2 is usually selected depending on the chosen diameter values D1 and D2. Then the optimal distance L1 can be determined by the distance L2 in order to get optimal milk froth results.

As a matter of non-restrictive illustration of a good working example, which have been obtained by many iterations and tests, the following dimensions (see FIG. 4) have turned out to be advantageous in order to maintain the frothed product:

The diameter D2 of the outlet 32 is preferably larger, preferably e.g. by a factor 2 or more, than the diameter D1 of the outlet opening 6.

The axial distance between the outlet opening 6 and the bottom wall 34 of the outer casing is preferably more than 3.0 mm, or even more than 4.0 mm.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A nozzle adaptable to a steam outlet of a coffee machine designed to froth a liquid, the nozzle comprising in a direction of the steam flow path:
a steam inlet opening,
a restriction with limited cross-section adapted to accelerate the velocity of the steam flow,
at least one tubular portion of mixing cavity having a cross-section larger than the restriction and comprising an opening,
wherein the nozzle comprises a conduit for the liquid or a liquid/air mixture, the conduit joining the steam flow path at the restriction or stream-upwards of the restriction,
the nozzle further comprises an outer casing comprising a smoothening reservoir and a jet breaking surface facing the opening and at least one outlet opening radially offset relatively to the opening of the portion of the enlarged mixing cavity, and
the outer casing is arranged at least partially around the tubular portion of mixing cavity.

2. Nozzle according to claim 1, wherein the casing forms a smoothening reservoir of annular section that extends concentrically around the tubular portion of the mixing cavity.

3. Nozzle according to claim 2, wherein the casing forms a portion of tube enclosing the entire tubular portion of the mixing cavity.

4. Nozzle according to claim 1, wherein the nozzle is made from a material which wears when exposed repeatedly to steam.

5. Nozzle according to claim 1, wherein the nozzle is made from a material selected from the group consisting of Polypropylene and Polyamide.

6. Nozzle according to claim 1, wherein the steam inlet opening, the restriction and the enlarged portion of mixing cavity are defined by two pieces which are horizontally partitioned and sealed with respect to the steam flow path.

7. Nozzle according to claim 6, wherein the two pieces are releasably connected to each other.

8. Nozzle according to claim 7, wherein the two pieces are clipped together.

9. Nozzle according to claim 7, wherein the horizontal partition of the two pieces comprises sealing means.

10. Nozzle according to claim 9, wherein the sealing means comprise at least one annular flange.

11. Nozzle according to claim 9, wherein the two pieces are welded.

12. Nozzle according to claim 1, wherein the outlet opening forms a small portion of tube that protrudes inwardly above the jet breaking surface.

13. A nozzle adaptable to a steam outlet of a coffee machine designed to froth a liquid comprising in a direction of the steam flow path:
a steam inlet opening,
a restriction with limited cross-section adapted to accelerate the velocity of the steam flow,
at least one tubular portion defining a mixing cavity having a cross-section larger than the restriction and from which the frothed liquid is drained,
wherein the nozzle furthermore comprises a conduit for the liquid or a liquid/air mixture, the conduit joining the steam flow path at the restriction or stream-upwards of the restriction, and
the steam inlet opening, the restriction and the tubular portion are defined by two pieces which are horizontally partitioned and sealed with regard to the steam flow path.

14. A nozzle adaptable to a steam outlet of a coffee machine designed to froth a liquid comprising in a direction of the steam flow path:
a steam inlet opening,
a restriction with limited cross-section adapted to accelerate the velocity of the steam flow,
at least one tubular portion of mixing cavity having a cross-section larger than the restriction and from which the frothed liquid is drained,
wherein the nozzle furthermore comprises a conduit for the liquid or a liquid/air mixture, the conduit joining the steam flow path at the restriction or stream-upwards of the restriction, and
the nozzle is made from a material which is selected such that it wears at regions where the steam from the steam inlet opening is impinging on it repeatedly such that the maximum number of use cycles of the nozzle is limited.

15. The nozzle according to claim 14, wherein it is geometrically arranged such that when exceeding the maximum number of use cycles, the quality of the produced froth is deteriorated.

16. The nozzle according to claim 14, wherein it is geometrically arranged such that when exceeding the maximum number of use cycles, the milk and/or air is no longer drawn in the nozzle.

17. The nozzle according to claim 16, wherein it is geometrically arranged such that when exceeding the maximum number of use cycles, the nozzle leaks.

18. The nozzle according to claim 16, wherein the cooperation of the water steam path and the material of the nozzle is selected such that the use cycles are limited to 1 to 50.

19. The nozzle according to claim 16, wherein the nozzle is made from material selected from the group consisting of Polypropylene or a Polyamide.

20. The nozzle according to claim 16, wherein the cooperation of the water steam path and the material of the nozzle is selected such that the use cycles are limited to 5 to 20.

* * * * *